(12) United States Patent
Zhu et al.

(10) Patent No.: US 11,429,436 B2
(45) Date of Patent: Aug. 30, 2022

(54) METHOD, DEVICE AND COMPUTER PROGRAM PRODUCT FOR DETERMINING EXECUTION PROGRESS OF TASK

(71) Applicant: EMC IP Holding Company LLC, Hopkinton, MA (US)

(72) Inventors: Xiaoliang Zhu, Shanghai (CN); Ming Zhang, Shanghai (CN); Jing Yu, Shanghai (CN); Yongsheng Guo, Shanghai (CN); Min Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 157 days.

(21) Appl. No.: 16/888,791

(22) Filed: May 31, 2020

(65) Prior Publication Data
US 2021/0263771 A1 Aug. 26, 2021

(30) Foreign Application Priority Data
Feb. 26, 2020 (CN) .......................... 202010121091.X (51) Int. Cl.
*G06F 9/48* (2006.01)
*G06F 11/34* (2006.01)

(52) U.S. Cl.
CPC ........ *G06F 9/4881* (2013.01); *G06F 11/3495* (2013.01)

(58) Field of Classification Search
CPC ............. G06F 11/3452; G06F 11/3495; G06F 2201/81; G06F 9/4881
See application file for complete search history.

(56) References Cited

U.S. PATENT DOCUMENTS

| | | | | |
|---|---|---|---|---|
| 2004/0226013 | A1* | 11/2004 | Mariotti | G06F 11/3419 718/100 |
| 2008/0196045 | A1* | 8/2008 | Chang | G06F 9/45512 719/320 |
| 2016/0041543 | A1* | 2/2016 | Monczynski | G05B 19/41875 700/97 |
| 2018/0307532 | A1* | 10/2018 | Di Balsamo | G06F 9/542 |

* cited by examiner

*Primary Examiner* — Jorge A Chu Joy-Davila
(74) *Attorney, Agent, or Firm* — Chamberlain, Hrdlicka, White, Williams & Aughtry (57) ABSTRACT

Embodiments of the present disclosure relate to a method, a device, and a computer program product for determining an execution progress of tasks. The method includes determining, according to a determination that a task is executed, whether historical execution information of the task is available. The method further includes determining the expected execution duration of the task based on the historical execution information of the task according to a determination that the historical execution information of the task is available. The method further includes determining the duration of completed execution for the task based on the time point at which execution of the task begins and the current time point. The method further includes determining the execution progress of the task based on the expected execution duration and the completed execution duration.

12 Claims, 4 Drawing Sheets

METHOD, DEVICE AND COMPUTER PROGRAM PRODUCT FOR DETERMINING EXECUTION PROGRESS OF TASK

CROSS-REFERENCE TO RELATED APPLICATIONS

This application claims priority to Chinese Patent Application No. 202010121091.X filed on Feb. 26, 2020. Chinese Patent Application No. 202010121091.X is hereby incorporated by reference in its entirety.

TECHNICAL FIELD

Embodiments of the present disclosure relate to the field of data processing, and in particular, to a method for determining an execution progress of a task, an electronic device, and a computer program product.

BACKGROUND

With the rapid development of computer technology, the number of computer applications is increasing rapidly. With the increase in computer applications, the amount of data that is processed is also increasing rapidly. Typically, processed data or newly generated data needs to be stored or protected by a data storage system. Valuable data of a user may often be protected by a data management system. When the user needs the data, the valuable data can be retrieved through the storage system.

In the data management system, various types of data management activities, data protection activities, and the like are usually carried out according to the needs of the user. For example, a virtual machine, database, and file system of a user are protected to a data protection storage device, data and data copies are managed according to a data protection policy, and so on. However, there are still various problems to be solved in data management systems.

SUMMARY OF THE INVENTION

In general, embodiments of the invention relate to a method, a device, and a computer program product for determining an execution progress of a task.

According to a first aspect of the present disclosure, a method for determining the execution progress of a task is provided. The method includes determining, according to a determination that the task is executed, whether historical execution information of the task is available. The method further includes determining the expected execution duration of the task based on the historical execution information of the task according to a determination that the historical execution information of the task is available. The method further includes determining the duration of completed execution for the task based on the time point at which execution of the task begins and the current time point. The method further includes determining the execution progress of the task based on the expected execution duration and the completed execution duration.

According to a second aspect of the present disclosure, an electronic device is provided. The electronic device includes a processor; and a memory storing computer program instructions, the processor running the computer program instructions in the memory to control the electronic device to perform actions including: determining, according to a determination that the task is executed, whether historical execution information of the task is available; determining the expected execution duration of the task based on the historical execution information of the task according to a determination that the historical execution information of the task is available; determining the duration of completed execution for the task based on the time point at which execution of the task begins and the current time point; and determining the execution progress of the task based on the expected execution duration and the completed execution duration.

According to a third aspect of the present disclosure, a computer program product is provided. The computer program product is tangibly stored in a non-transitory computer-readable medium and includes machine-executable instructions. When executed, the machine-executable instructions cause a machine to perform steps of the method in the first aspect of the present disclosure.

BRIEF DESCRIPTION OF THE DRAWINGS

The above and other objectives, features, and advantages of the present disclosure will become more apparent based on a more detailed description of example embodiments of the present disclosure with reference to accompanying drawings. Identical reference signs usually represent identical components in the example embodiments of the present disclosure.

Identical or corresponding signs represent identical or corresponding parts in various drawings.

DETAILED DESCRIPTION OF THE EMBODIMENTS

The embodiments of the present disclosure will be described in more detail below with reference to the accompanying drawings. Some embodiments of the present disclosure are shown in the accompanying drawings. However, it should be understood that the present disclosure can be implemented in various forms and should not be construed as being limited to the embodiments described here. Rather, the embodiments are provided for a more thorough and complete understanding of the present disclosure. It should be appreciated that the accompanying drawings and the embodiments of the present disclosure are for purposes of illustration only and are not intended to limit the scope of protection of the present disclosure.

In the description of the embodiments of the present disclosure, the term "include" and its similar terms should be understood as open inclusion, i.e., "including, but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The principle of the present disclosure will be described in the following with reference to several example embodiments shown in the accompanying drawings. Although preferred embodiments of the present disclosure are shown in the accompanying drawings, it should be understood that the embodiments are described only to enable those skilled in the art to better understand and then implement the present disclosure, but not to limit the scope of the present disclosure in any way.

Conventionally, a task to be executed is usually modeled as a workflow process in the data management system. The task is divided into different sub-tasks to be executed in the workflow process. For example, a data management task may be divided into sub-tasks such as asset allocation, asset protection, replication, and replication to the cloud. When the task modeled as a workflow process is executed, the execution progress of the task usually needs to be determined.

The task modeled as a workflow process usually includes a plurality of sub-tasks. Typically, the progress of the task is determined by its subtasks. The progress of the task is usually determined according to the following formula (1):

$$\text{execution progress} = (\text{the number of completed sub-tasks})/(\text{the total number of sub-tasks}) * 100\% \quad (1)$$

To determine the execution progress according to the above formula (1), it is necessary to assume that it will take the same time to complete all the sub-tasks. In practice, however, this is not the case under most circumstances. For example, in a data protection task, an asset allocation subtask in the data protection task is a very fast task. If the asset is large, it may take several hours to complete an asset protection task in the data protection task. Therefore, the execution progress calculated with the above algorithm is not accurate, which affects the customer experience.

In order to solve the above and/or other potential problems, the present disclosure provides a method for determining the execution progress of a task. In the method, it is determined whether historical execution information of the task is available when the task is executed. The expected execution duration of the task is determined based on the historical execution information of the task if the historical execution information of the task is available. Then, the execution duration of the task is determined based on the time point at which execution of the task begins and the current time point. Thus, the execution progress of the task can be determined based on the expected execution duration and the completed execution duration. With the above method, the execution progress of a task is determined from the expected execution duration predicted from historical data and the execution duration, so that the execution progress of the task can be more accurately calculated, thereby improving user experience.

Figure 1:
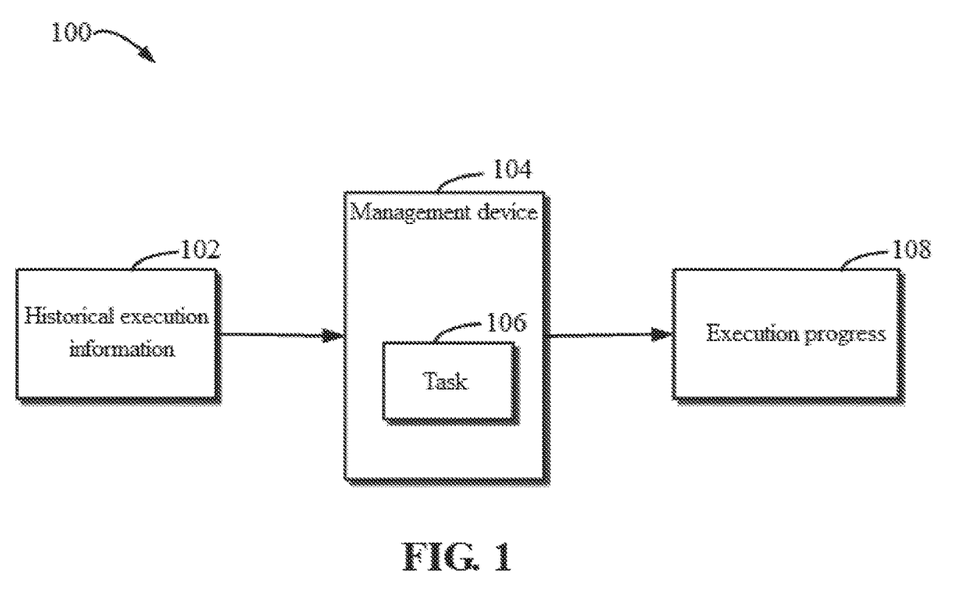
FIG. 1 is a schematic diagram of example environment 100 in which a device and/or a method according to an embodiment of the present disclosure can be implemented.

Embodiments according to the present disclosure are described in detail in the following with reference to FIG. 1 through FIG. 4. FIG. 1 is a schematic diagram of example environment 100 in which a device and/or a method according to an embodiment of the present disclosure can be implemented.

As shown in FIG. 1, example environment 100 includes management device 104. Execution of task 106 is managed by management device 104. In some embodiments, task 106 is a variety of services for data storage or management. In an example, task 106 may be a data protection activity for protecting a virtual machine, a database, and a file system of a user to a data protection storage device. In another example, task 106 is a management activity for managing data and data copies according to a data protection policy. Task 106 may include one or more sub-tasks; for example, a data management task may be divided into a plurality of sub-tasks such as asset allocation, asset protection, replication, and replication to the cloud. Alternatively or additionally, the various sub-tasks are sequentially executed sub-tasks.

As shown in FIG. 1, management device 104 includes one task 106, which is only used to describe the present disclosure but not to specifically limit the present disclosure. In other embodiments, management device 104 may be configured to manage any appropriate number of tasks. In addition, management device 104 shown in FIG. 1 is only an example but not a specific limitation to the present disclosure. In some embodiments, the function of management device 104 may be distributed on a plurality of computing devices or a plurality of different virtual machines of a cloud platform.

Management device 104 includes, but is not limited to, a personal computer, a server computer, a handheld or laptop device, a mobile device (such as a mobile phone, a personal digital assistant (PDA), or a media player), a multi-processor system, a consumer electronic product, a minicomputer, a mainframe computer, a distributed computing environment including any of the above systems or devices, and so on.

Management device 104 is configured to manage the execution of task 106, including execution progress 108 of task 106. When management device 104 determines execution progress 108 of task 106, management device 104 needs to determine whether task 106 has been executed previously. Then, management device 104 determines execution progress 108 of task 106 with different methods according to whether task 106 has been executed.

If task 106 has been executed previously, management device 104 needs to acquire historical execution information 102 of task 106. Then, management device 104 predicts the expected execution duration of task 106 based on historical execution information 102 of task 106. In some embodiments, historical execution information 102 of task 106 includes the number of times task 106 has been executed, the execution duration of each execution of task 106, and so on. Therefore, the number of times task 106 has been executed and a set of historical execution durations corresponding to respective executions are determined by management device 104 based on historical execution information 102 of task 106.

When execution progress 108 of task 106 is determined by management device 104 based on historical execution information 102 of task 106, generally, different operations may be performed to process historical execution information 102 according to the number of times task 106 has been executed. If the number of times task 106 has been executed is above a threshold number, a predetermined number of historical execution durations in the set of historical execution durations which are most recent to the current moment are processed with a first operation. For example, when the number of times task 106 has been executed is greater than the threshold number, a number M of historical execution durations which are most recent to the current moment are selected from the set of historical execution durations, where M is a positive integer greater than 1. In some embodiments, the first operation is an exponential moving average algorithm. In some embodiments, the threshold number is 15. In some embodiments, the threshold number is any other appropriate number. The above example is only used to describe the present disclosure rather than to specifically limit the present disclosure.

If it is determined by management device 104 that the number of times task 106 has been executed is not above the threshold number, the expected execution duration of task 106 is determined by processing historical execution information 102 of task 106 with a second operation. In some embodiments, the second operation is to determine the expected execution duration by calculating the average of the set of historical durations. In some embodiments, the second operation is to determine the expected execution duration by calculating the weighted average of the set of historical durations. The above example is only used to describe the present disclosure rather than to specifically limit the present disclosure.

After execution progress 108 of task 106 is determined, execution progress 108 may be sent by management device 104 to a customer or another computing device to show how much of task 106 has been executed.

The schematic diagram of environment 100 in which a device and/or a method according to an embodiment of the present disclosure can be implemented is described above with reference to FIG. 1. A flowchart of method 200 for determining execution progress 108 of task 106 according to an embodiment of the present disclosure will be described in the following with reference to FIG. 2. Method 200 can be performed in management device 104 in FIG. 1 or in any other appropriate device.

Figure 2:
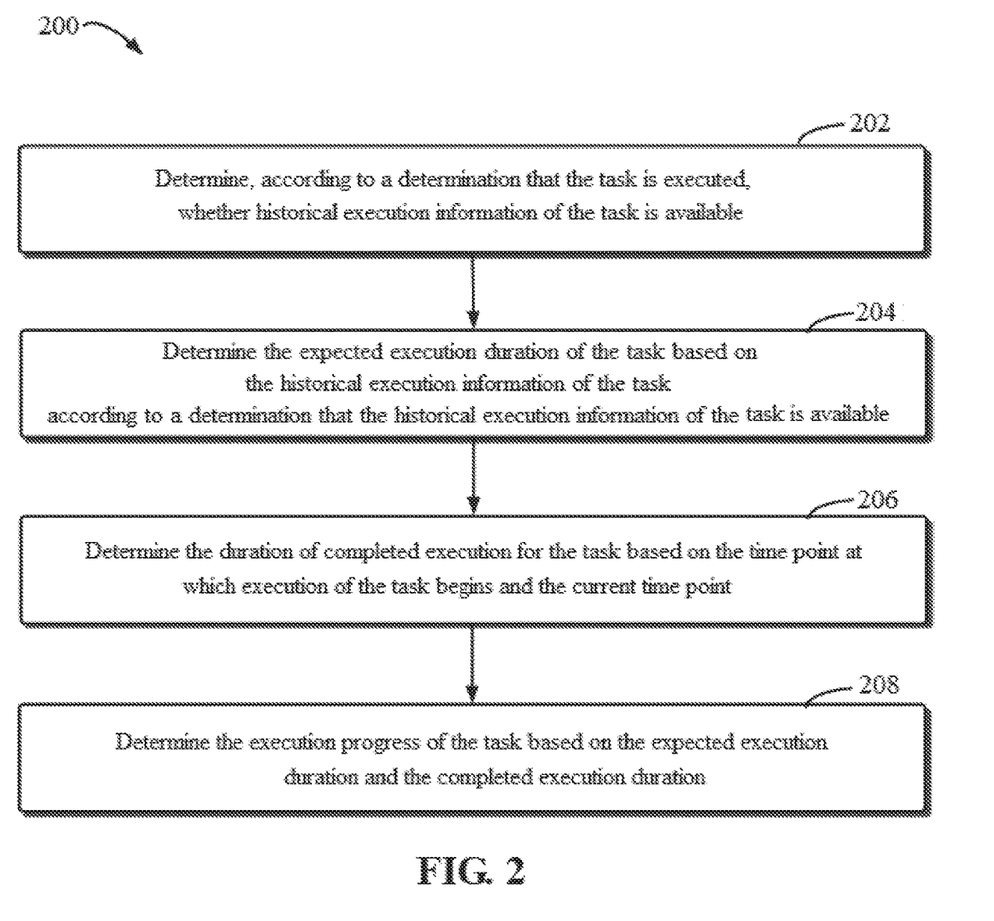
FIG. 2 is a flowchart of method 200 for determining the execution progress of a task according to an embodiment of the present disclosure.

In block 202, management device 104 determines whether historical execution information 102 of task 106 is available according to determining whether task 106 has been executed. The operation of task 106 is managed by management device 104. If task 106 is being executed for the first time, no available historical execution information 102 will exist. If task 106 has been executed previously, historical execution information 102 of task 106 may be available. Therefore, when a request for executing task 106 from the user is received by management device 104 or task 106 is scheduled by a scheduler in management device 104 for execution, it may be first determined by management device 104 whether historical execution information 102 corresponding to task 106 exists.

In some embodiments, a request may be sent by management device 104 to a computing device where historical execution information 102 of task 106 is stored to determine whether historical execution information 102 exists. In some embodiments, historical execution information 102 of task 106 is stored in management device 104. Therefore, management device 104 searches in an internal storage apparatus to check whether historical execution information 102 of task 106 exists. The above example is only used to describe the present disclosure rather than to specifically limit the present disclosure.

In block 204, the expected execution duration of the task is determined by management device 104 based on historical execution information 102 of task 106 according to a determination that historical execution information 102 of task 106 is available. When it is determined that historical execution information 102 of task 106 exists, historical execution information 102 will be acquired by management device 104 from another computing device or a local storage apparatus. After historical execution information 102 is acquired, the expected execution duration of task 106 will be predicted by management device 104 based on historical execution information 102. The process of determining the expected execution duration of task 106 by management device 104 will be described below in detail with reference to FIG. 3.

In block 206, the duration of completed execution for task 106 is determined by management device 104 based on the time point at which execution of task 106 begins and the current time point. The time point at which execution of task 106 begins will be stored by management device 104 when task 106 is executed. When the current duration of execution for task 106 is calculated by management device 104, the duration of completed execution for task 106 may be determined according to the current time point and the time point at which the execution begins. For example, the completed execution duration is calculated according to the following formula (2):

$$\text{completed execution duration} = \text{current time point} - \text{time point at which execution begins} \quad (2)$$

In block 208, execution progress 108 of task 106 is determined by management device 104 based on the expected execution duration and the completed execution duration. In some embodiments, execution progress 108 can be determined by management device 104 based on the expected execution duration and the completed execution duration after the expected execution duration and the completed execution duration are obtained. In some embodiments, execution progress 108 of task 106 is determined according to the following formula (3):

$$\text{execution progress} = (\text{completed execution duration}) / (\text{expected execution duration}) * 100\%. \quad (3)$$

Since execution progress 108 is predicted according to the expected execution duration, execution progress 108 may be above 100%, in which case execution progress 108 indicates that the task has been completed. If the task has not been actually completed at this point, execution progress 108 is not accurate and needs to be adjusted. To this end, after execution progress 108 is determined, management device 104 determines whether execution progress 108 indicates that task 106 has been completed. When the execution progress calculated by management device 104 indicates that the task has been completed, for example, the execution progress calculated is 100% or even 102%, execution progress 108 of task 106 further needs to be checked according to whether task 106 has been actually completed. Therefore, when execution progress 108 indicates that task 106 has been completed, it is determined by management device 104 whether task 106 has been actually completed. If task 106 has not been actually completed, execution progress 108 is set to a predetermined value, for example, 95%. If task 106 has been actually completed, execution progress 108 is set to 100%. If the determined execution progress 108 does not indicate that task 106 has been completed, execution progress 108 is not processed.

The process of determining execution progress 108 when the historical execution information is available has been described above. If it is determined that the historical execution information of task 106 is not available, for example, if task 106 has not yet been executed, or the historical execution information of task 106 is stored in an inaccessible position, execution progress 108 can be determined in other manners. In an embodiment, if the historical execution information is not available, the total number of sub-tasks included in task 106 can be determined by management device 104. For ease of description, the total number is also referred to as the first number. Then, the number of sub-tasks that have been completed in task 106 is determined by management device 104, which is also referred to as the second number. A degree of completion of sub-tasks being run in task 106 further needs to be determined by management device 104. For example, the sub-tasks can be divided into 100 sub-sections, and the degree of completion of the sub-tasks is determined by dividing the completed sub-sections by 100. Execution progress 108 of the task is determined by management device 104 based on the first number, the second number, and the degree of completion.

In some embodiments, execution progress 108 can be calculated according to the following formula (4).

$$\text{execution progress}=(\text{the number of completed sub-tasks}+\text{degree of completion of sub-tasks being run})/(\text{the total number of sub-tasks})*100. \qquad (4)$$

With the above method, the execution progress of a task is determined using the expected execution duration predicted from historical data and the execution duration, so that the execution progress of the task can be more accurately calculated, improving user experience.

Figure 3:
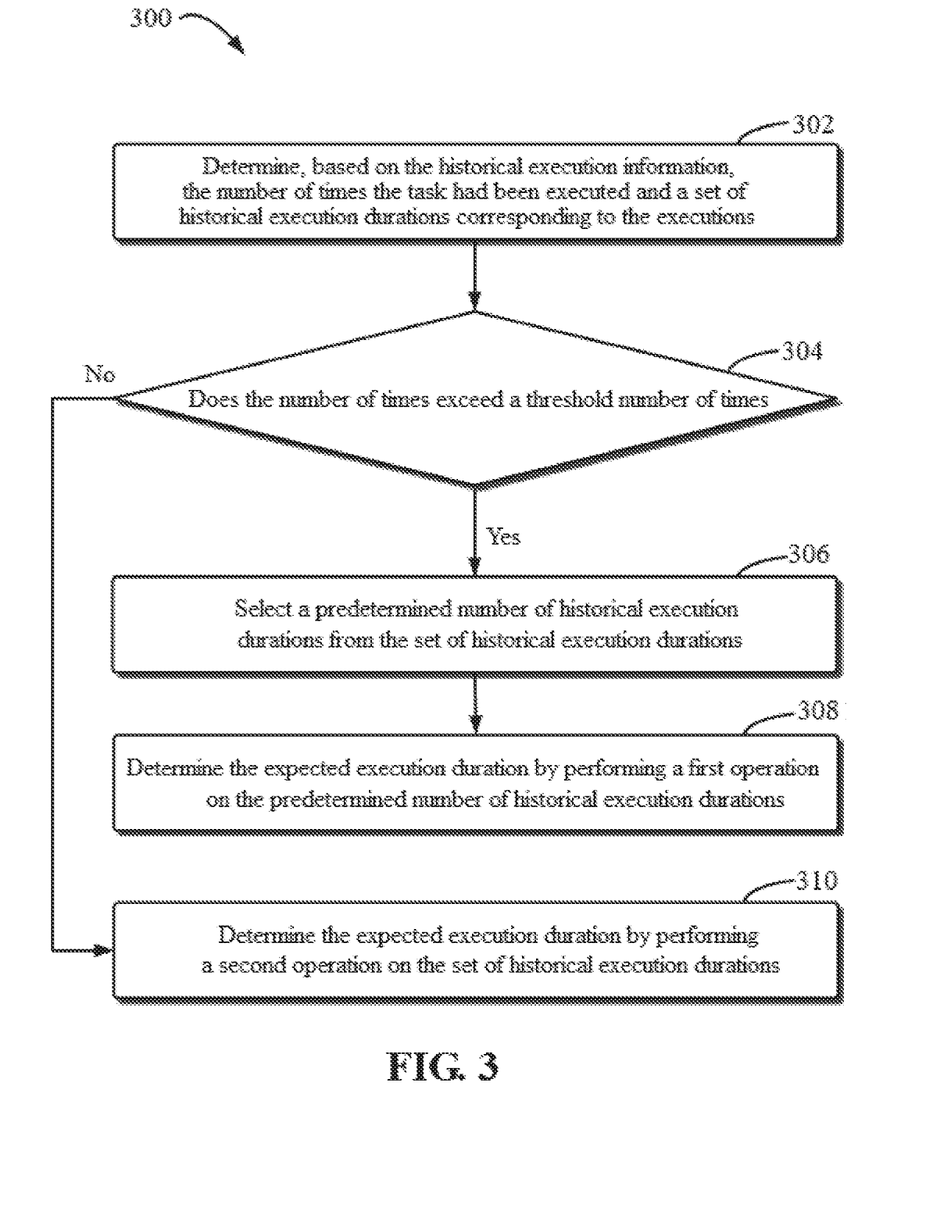
FIG. 3 is a flowchart of method 300 for determining the expected execution duration of a task according to an embodiment of the present disclosure.

With reference to FIG. 2, method 200 for determining the execution progress of a task according to an embodiment of the present disclosure has been described above. The operation for determining the expected execution duration of a task at block 204 in FIG. 2 will be described in the following with reference to FIG. 3. FIG. 3 is a flowchart of method 300 for determining the expected execution progress of a task according to an embodiment of the present disclosure. Method 300 in FIG. 3 can be performed by management device 104 in FIG. 1 or any other appropriate device.

In block 302, the number of times task 106 has been executed and a set of historical execution durations corresponding to respective executions are determined by management device 104 based on historical execution information 102. In some embodiments, historical execution information 102 includes the number of times task 106 has been executed and a historical execution duration corresponding to each execution. Therefore, the number of times task 106 has been executed and a set of historical execution durations can be determined by management device 104 from the obtained historical execution information.

In block 304, management device 104 determines whether the number of times is above a threshold number. In order to calculate the expected execution duration more accurately, the expected execution duration can be calculated with different methods based on whether the number of times is above the threshold number. In some embodiments, the threshold number is 15. In some embodiments, the threshold number may be any appropriate number. The above example is only used to describe the present disclosure rather than to specifically limit the present disclosure.

If the number of times is above the threshold number, in block 306, a predetermined number of historical execution durations are selected from the set of historical execution durations by management device 104. When the number of times is above the threshold number, it indicates that task 106 has been executed many times. In order to determine the historical execution durations more accurately, the expected execution duration is usually determined by selecting a predetermined number of historical execution durations most recent to the current execution time.

In block 308, the expected execution duration is determined by management device 104 by performing a first operation on the predetermined number of historical execution durations. In some embodiments, the expected execution duration of task 106 is determined by management device 104 by processing the predetermined number of historical execution durations according to the following formula (5):

$$\text{expected execution duration}=\alpha*(\Sigma_{i=(n-m-1)}^{n-1}(1-\alpha)^{(i-1)}*D(i)) \qquad (5)$$

where $$\alpha = \frac{2}{m},$$

m denotes the number of historical execution durations selected from a set of historical execution durations, n denotes the current number of times task 106 has been executed, and D(i) denotes the historical execution duration of the ith execution.

If the number of times is not above the threshold number, in block 310, the expected execution duration is determined by management device 104 by performing a second operation on the set of historical execution durations. The second operation is different from the first operation. In some embodiments, the expected execution duration of task 106 is determined by management device 104 according to the following formula (6):

$$\text{expected execution duration} = \frac{\left(\sum_{i=1}^{n-1} D(i)\right)}{n-1} \qquad (6)$$

where n denotes the current number of times task 106 has been executed and D(i) denotes the historical execution duration of the ith execution.

With the above method, the expected execution duration of the execution of a task can be predicted quickly and accurately, so that prediction for the execution progress of the task can be improved, improving user experience.

Figure 4:
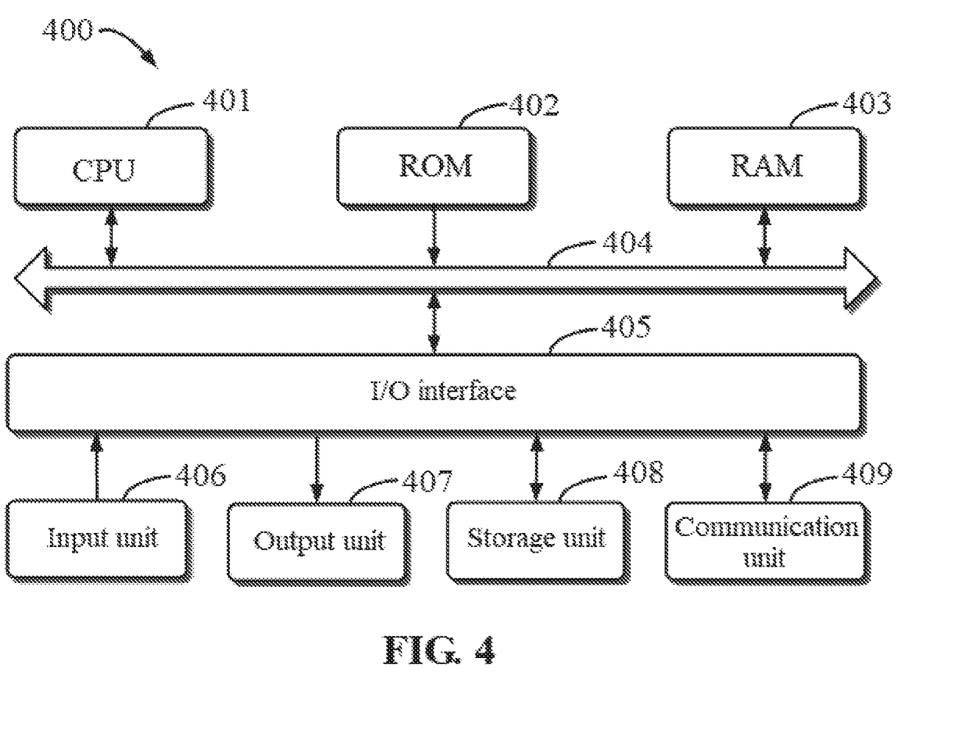
FIG. 4 is a schematic block diagram of example device 400 adapted to implement an embodiment of the present disclosure.

FIG. 4 is a schematic block diagram of example device 400 that can be configured to implement an embodiment of the present disclosure. For example, management device 104 as shown in FIG. 1 can be implemented by device 400. As shown in the figure, device 400 includes central processing unit (CPU) 401 that can perform various appropriate actions and processing according to computer program instructions stored in read-only memory (ROM) 402 or computer program instructions loaded from storage unit 408 to random access memory (RAM) 403. In RAM 403, various programs and data required for the operation of device 400 can also be stored. CPU 401, ROM 402, and RAM 403 are connected to each other through bus 404. Input/output (I/O) interface 405 is also coupled to bus 404.

A plurality of components in device 400 are coupled to I/O interface 405, including: input unit 406, such as a keyboard and a mouse; output unit 407, such as various types of displays and speakers; storage unit 408, such as a magnetic disk and an optical disc; and communication unit 409, such as a network card, a modem, and a wireless communication transceiver. Communication unit 409 allows device 400 to exchange information/data with other devices over a computer network such as the Internet and/or various telecommunication networks.

The various methods and processes described above, for example, method 200 and method 300, may be performed by processing unit 401. For example, in some embodiments, method 200 and method 300 can be implemented as a computer software program that is tangibly included in a machine-readable medium, such as storage unit 408. In some embodiments, some or all of the computer program can be loaded and/or installed onto device 400 via ROM 402 and/or communication unit 409. When the computer program is loaded into RAM 403 and executed by CPU 401, one or more actions of method 200 and method 300 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium can be a physical device capable of retaining and storing instructions used by an instruction-executing device. The computer-readable storage medium can be, for example, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punched card or protrusions in a groove on which instructions are stored, and any appropriate combination of the above. The computer-readable storage medium as used herein is not explained as instant signals per se, such as radio waves or other electromagnetic waves propagated freely, electromagnetic waves propagated through waveguides or other transmission media (e.g., light pulses propagated through fiber-optic cables), or electrical signals transmitted over wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++ as well as conventional procedural programming languages such as the "C" language or similar programming languages. The computer-readable program instructions may be executed completely on a user's computer, partially on the user's computer, as a separate software package, partially on the user's computer and partially on a remote computer, or completely on the remote computer or server. In the case where a remote computer is involved, the remote computer can be connected to a user computer over any kind of network, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The computer-readable program instructions are executable by the electronic circuit to implement various aspects of the present disclosure.

Various aspects of the present disclosure are described here with reference to flowcharts and/or block diagrams of the method, the apparatus/system, and the computer program products according to the embodiments of the present disclosure. It should be understood that each block in the flowcharts and/or block diagrams and a combination of blocks in the flowcharts and/or block diagrams can be implemented by the computer-readable program instructions.

The computer-readable program instructions can be provided to a processing unit of a general purpose computer, a special purpose computer, or another programmable data processing apparatus to produce a machine such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium that can guide the computer or another programmable data processing apparatus and/or other devices to work in a specific manner, such that the computer-readable medium storing the instructions includes a manufacture including instructions for implementing various aspects of functions/actions specified by one or more blocks in the flowcharts and/or block diagrams.

The computer-readable program instructions may also be loaded onto a computer, another programmable data processing apparatus, or another device such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architecture, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing the specified logical functions. In some alternative implementations, functions labeled in the blocks may occur in an order different from that as labeled in the accompanying drawing. For example, two successive blocks may actually be performed basically in parallel, or they can be performed in an opposite order sometimes, depending on the functions involved. It also should be noted that each block in the block diagrams and/or flowcharts, and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments, or technical improvements of the technologies on the market, or to enable other persons of ordinary skill in the art to understand the embodiments disclosed here.

The invention claimed is:

1. A method for determining execution progress of tasks, comprising:
   obtaining historical execution information of a task from a storage apparatus of a computing device;
   determining an expected execution duration of the task based on the historical execution information of the task, wherein determining the expected execution duration comprises:
      determining, based on the historical execution information, a number of times the task has been executed and a set of historical execution durations corresponding to respective executions;
      determining that the number of times is above a threshold number;
      selecting a predetermined number of historical execution durations from the set of historical execution durations in response to the number of times being above the threshold number; and
      determining the expected execution duration by performing an operation on the predetermined number of historical execution durations;
   determining a completed execution duration for the task based on a starting time point at which execution of the task began and a current time point;
   determining an execution progress of the task based on the expected execution duration and the completed execution duration, wherein the execution progress is more accurate than a progress based solely on the completed execution; and
   providing the execution progress to a user of the computing device.

2. The method of claim 1, wherein determining the expected execution duration further comprises:
   determining, based on the historical execution information, a second number of times the task has been executed and a second set of historical execution durations corresponding to respective executions;
   determining that the second number of times is below a second threshold number;
   determining the expected execution duration by performing a second operation on the second set of historical execution durations in response to the second number of times not being above the threshold number.

3. The method of claim 1, further comprising:
   determining a first number of sub-tasks comprised in a second task according to a determination that second historical execution information for the second task is not available;
   determining a second number of completed sub-tasks in the second task;
   determining a degree of completion of sub-tasks being executed in the second task; and
   determining the execution progress of the second task based on the first number, the second number, and the degree of completion.

4. The method of claim 1, further comprising:
   determining whether the execution progress indicates that the task has been completed; and
   according to a determination that the execution progress indicates the task has been completed, determining whether the task has actually been completed; and
   setting the execution progress to a predetermined value according to a determination that the task has not actually been completed.

5. An electronic device, comprising:
   a processor; and
   a memory storing computer program instructions, the processor running the computer program instructions in the memory to control the electronic device to perform a method, the method comprising:
      obtaining historical execution information of a task from a storage apparatus of a computing device;
      determining an expected execution duration of the task based on the historical execution information of the task, wherein determining the expected execution duration comprises:
         determining, based on the historical execution information, a number of times the task has been executed and a set of historical execution durations corresponding to respective executions;
         determining that the number of times is above a threshold number;
         selecting a predetermined number of historical execution durations from the set of historical execution durations in response to the number of times being above the threshold number; and
         determining the expected execution duration by performing an operation on the predetermined number of historical execution durations;
      determining a completed execution duration for the task based on a starting time point at which execution of the task began and a current time point;
      determining an execution progress of the task based on the expected execution duration and the completed execution duration, wherein the execution progress is more accurate than a progress based solely on the completed execution; and
      providing the execution progress to a user of the computing device.

6. The electronic device of claim 5, wherein determining the expected execution duration further comprises:
   determining, based on the historical execution information, a second number of times the task has been executed and a second set of historical execution durations corresponding to respective executions;
   determining that the second number of times is below a second threshold number;
   determining the expected execution duration by performing a second operation on the second set of historical execution durations in response to the second number of times not being above the threshold number.

7. The electronic device of claim 5, wherein the method further comprises:
   determining a first number of sub-tasks comprised in a second task according to a determination that second historical execution information for the second task is not available;

determining a second number of completed sub-tasks in the second task;

determining a degree of completion of sub-tasks being executed in the second task; and determining the execution progress of the second task based on the first number, the second number, and the degree of completion.

8. The electronic device of claim 5, wherein the method further comprises:

determining whether the execution progress indicates that the task has been completed; and according to a determination that the execution progress indicates the task has been completed, determining whether the task has actually been completed; and setting the execution progress to a predetermined value according to a determination that the task has not actually been completed.

9. A computer program product tangibly stored in a non-transitory computer-readable medium and comprising machine-executable instructions, wherein when executed, the machine-executable instructions cause a machine to perform a method comprising:

obtaining historical execution information of a task from a storage apparatus of a computing device;

determining an expected execution duration of the task based on the historical execution information of the task, wherein determining the expected execution duration comprises:

determining, based on the historical execution information, a number of times the task has been executed and a set of historical execution durations corresponding to respective executions;

determining that the number of times is above a threshold number;

selecting a predetermined number of historical execution durations from the set of historical execution durations in response to the number of times being above the threshold number; and determining the expected execution duration by performing an operation on the predetermined number of historical execution durations;

determining a completed execution duration for the task based on a starting time point at which execution of the task began and a current time point;

determining an execution progress of the task based on the expected execution duration and the completed execution duration, wherein the execution progress is more accurate than a progress based solely on the completed execution; and providing the execution progress to a user of the computing device.

10. The computer program product of claim 9, wherein determining the expected execution duration further comprises:

determining, based on the historical execution information, a second number of times the task has been executed and a second set of historical execution durations corresponding to respective executions;

determining that the second number of times is below a second threshold number;

determining the expected execution duration by performing a second operation on the second set of historical execution durations in response to the second number of times not being above the threshold number.

11. The computer program product of claim 9, wherein the method further comprises:

determining a first number of sub-tasks comprised in a second task according to a determination that second historical execution information for the second task is not available;

determining a second number of completed sub-tasks in the second task;

determining a degree of completion of sub-tasks being executed in the second task; and determining the execution progress of the second task based on the first number, the second number, and the degree of completion.

12. The computer program product of claim 9, wherein the method further comprises:

determining whether the execution progress indicates that the task has been completed; and according to a determination that the execution progress indicates the task has been completed, determining whether the task has actually been completed; and setting the execution progress to a predetermined value according to a determination that the task has not actually been completed.

* * * * *